(12) United States Patent
Sundara et al.

(10) Patent No.: US 9,847,534 B2
(45) Date of Patent: Dec. 19, 2017

(54) METAL-ALLOY GRAPHENE NANOCOMPOSITES AND METHODS FOR THEIR PREPARATION AND USE

(75) Inventors: Ramaprabhu Sundara, Chennai (IN); Vinayan Bhaghavathl Parambath, Malappuram (IN); Rupali Nagar, Lucknow (IN); Rajalakshmi Natarajan, Chennai (IN)

(73) Assignee: INDIAN INSTITUTE OF TECHNOLOGY MADRAS, Chennai (IN)

( * ) Notice: Subject to any disclaimer, the term of this patent is extended or adjusted under 35 U.S.C. 154(b) by 567 days.

(21) Appl. No.: 14/397,197

(22) PCT Filed: Aug. 8, 2012

(86) PCT No.: PCT/IB2012/001523
§ 371 (c)(1),
(2), (4) Date: Mar. 26, 2015

(87) PCT Pub. No.: WO2013/160719
PCT Pub. Date: Oct. 31, 2013

(65) Prior Publication Data
US 2015/0200403 A1    Jul. 16, 2015

(30) Foreign Application Priority Data
Apr. 26, 2012 (IN) .......................... 1646/CHE/2012

(51) Int. Cl.
*B01J 23/42* (2006.01)
*B01J 31/18* (2006.01)
(Continued)

(52) U.S. Cl.
CPC .............. *H01M 4/921* (2013.01); *B05D 1/38* (2013.01); *B05D 3/0254* (2013.01); *B05D 7/548* (2013.01);
(Continued)

(58) Field of Classification Search
CPC .... B01J 23/42; B01J 23/8906; B01J 23/8913; B01J 23/892; B01J 31/1691; B01J 31/18;
(Continued)

(56) References Cited

U.S. PATENT DOCUMENTS

| 7,108,939 B2 | 9/2006 | Suzuki et al. |
| 2009/0047579 A1 | 2/2009 | Jang et al. |

(Continued)

FOREIGN PATENT DOCUMENTS

| CN | 10 3372428 | * 10/2013 | .............. B01J 23/42 |
| CN | 10 3413951 | * 11/2013 | .............. B01J 23/46 |

(Continued)

OTHER PUBLICATIONS

"Graphene as a new carbon support for low-temperature fuel cell catalysts," Ermete Antolini. Applied Catalysis B: Environmental 123-124 (2012), pp. 52-68.*

(Continued)

*Primary Examiner* — Patricia L Hailey
(74) *Attorney, Agent, or Firm* — Turk IP Law, LLC (57) ABSTRACT

Methods of forming a metal-alloy graphene nanocomposites are provided. The methods include providing a graphene substrate and forming a conducting polymer layer on a first major surface of the graphene substrate. The methods also include pyrolyzing the conducting polymer layer to form a nitrogen-doped graphene substrate and dispersing a plurality of metal-alloy nanoparticles on a first surface of the nitrogen-doped graphene substrate to form the nanocomposite.

35 Claims, 7 Drawing Sheets

(51) Int. Cl.

| | |
|---|---|
| C01B 31/04 | (2006.01) |
| C22C 5/04 | (2006.01) |
| C22C 19/00 | (2006.01) |
| C22C 19/03 | (2006.01) |
| C22C 19/07 | (2006.01) |
| H01M 4/92 | (2006.01) |
| B05D 1/38 | (2006.01) |
| B05D 3/02 | (2006.01) |
| B05D 7/00 | (2006.01) |
| H01M 4/86 | (2006.01) |
| H01M 4/88 | (2006.01) |
| H01M 4/90 | (2006.01) |
| H01M 8/1018 | (2016.01) |

(52) U.S. Cl.
CPC ....... *H01M 4/8657* (2013.01); *H01M 4/8817* (2013.01); *H01M 4/8825* (2013.01); *H01M 4/9041* (2013.01); *H01M 4/926* (2013.01); *H01M 2008/1095* (2013.01)

(58) Field of Classification Search
CPC .... B01J 31/1825; B01J 31/184; H01M 4/921; H01M 4/8657; H01M 4/8817; H01M 4/8825; H01M 4/9041; H01M 4/926; H01M 2008/1095; C01B 31/0206; C01B 31/04; C01B 31/0438; C01B 2204/00; C22C 5/04; C22C 19/00; C22C 19/03; C22C 19/07; Y10S 977/734
USPC .......... 502/185; 420/435, 441, 466; 423/448
See application file for complete search history.

(56) References Cited

U.S. PATENT DOCUMENTS

| | | | |
|---|---|---|---|
| 2011/0082024 A1 | 4/2011 | Liu et al. | |
| 2011/0165321 A1 | 7/2011 | Zhamu et al. | |
| 2011/0229766 A1 | 9/2011 | Ozaki et al. | |
| 2011/0260119 A1* | 10/2011 | Zelenay | H01M 4/9083 252/513 |
| 2012/0028127 A1 | 2/2012 | Wei et al. | |
| 2013/0288155 A1* | 10/2013 | Kim | H01M 4/926 429/483 |
| 2014/0054550 A1* | 2/2014 | Hong | H01L 29/1606 257/29 |
| 2015/0030968 A1* | 1/2015 | Schwab | C01B 31/0476 429/532 |
| 2015/0343428 A1* | 12/2015 | Kim | B01J 35/026 502/185 |
| 2015/0367322 A1* | 12/2015 | Sundara | B01J 20/20 423/648.1 |

FOREIGN PATENT DOCUMENTS

| | | | | |
|---|---|---|---|---|
| CN | 10 3816894 | * | 5/2014 | .............. B01J 23/46 |
| CN | 10 5435780 | * | 3/2016 | .............. B01J 23/46 |
| CN | 10 6148910 | * | 11/2016 | .............. C23C 16/26 |
| CN | 10 6207202 | * | 12/2016 | .............. B82Y 30/00 |
| DE | EP 2687483 A1 | * | 1/2014 | .............. C01B 31/00 |
| IN | WO 2013160719 A1 | * | 10/2013 | .............. H01M 4/921 |

OTHER PUBLICATIONS

"Graphene-based nanocomposites: preparation, functionalization, and energy and environmental applications," Haixin Chang et al. Energy & Environmental Science, 2013, 6 pp. 3483-3507.*

"One-step electrochemical composite polymerization of polypyrrole integrated with functionalized graphene/carbon nanotubes nanostructured composite film for electrochemical capacitors," Bing Ding et al. Electrochimica Acta 62 (2012), pp. 132-139.*

"Synthesis of graphene-supported hollow Pt—Ni nanocatalysts for highly active electrocatalysis toward the methanol oxidation reaction," Yaojuan Hu et al. Electrochimica Acta 85 (2012), pp. 314-321.*

"Synthesis of FeCo nanocrystals encapsulated in nitrogen-doped graphene layers for use as highly efficient catalysts for reduction reactions," Lin Hu et al. Nanoscale, 2015, 7, pp. 450-454.*

"Nitrogen doped graphene nanoplatelets as catalyst support for oxygen reduction reaction in proton exchange membrane fuel cell," R. Imran Jafri et al. Journal of Materials Chemistry, 2010, 20, pp. 7114-7117.*

"Electrochemical properties of graphene nanosheets/polyaniline nanofibers composites as electrode for supercapacitors," Jing Li et al. Journal of Power Sources 196 (2011), pp. 10775-10781.*

"Graphene supported platinum nanoparticles as anode electrocatalyst for direct borohydride fuel cell," Xue Liu et al. International Journal of Hydrogen Energy 37 (2012), pp. 17984-17991.*

"Multimetal-MOF-derived transition metal alloy NPs embedded in an N-doped carbon matrix: highly active catalysts for hydrogenation reactions," Jilan Long et al. Journal of Materials Chemistry A, 2016, 4, pp. 10254-10262.*

"One-step electrochemical synthesis of tunable nitrogen-doped graphene," Fengliu Lou et al. Journal of Materials Chemistry A, 2016, 4, pp. 1233-1243.*

"Palladium nanoparticles decorated graphite nanoplatelets for room temperature carbon dioxide adsorption," Ashish Kumar Mishra et al. Chemical Engineering Journal 187 (2012), pp. 10-15.*

"The role of transition metals in non-precious nitrogen-modified carbon-based electrocatalysts for oxygen reduction reaction," Hyung-Suk Oh et al. Journal of Power Sources 212 (2012), pp. 220-225.*

"Comparison of hydrogen adsorption abilities of platinum-loaded carbon fibers prepared using two different methods," J. Ozaki et al. Carbon 38 (2000), pp. 775-785.*

"Nitrogen-Doped Graphene and Its Iron-Based Composite as Efficient Electrocatalysts for Oxygen Reduction Reaction," Khaled Parvez et al. ACS Nano, vol. 6, No. 11 (2012), pp. 9541-9550.*

"Platinum and platinum-iron alloy nanoparticles dispersed nitrogen-doped graphene as high performance room temperature hydrogen sensor," Raghu Sripada et al. International Journal of Hydrogen Energy 40 (2015), pp. 10346-10353.*

"Platinum-TM (TM=Fe, Co) alloy nanoparticles dispersed nitrogen doped (reduced graphene oxide-multiwalled carbon nanotube) hybrid structure cathode electrocatalysts for high performance PEMFC applications," B. P. Vinayan et al. Nanoscale, 2013,5 pp. 5109-5118.*

"Carbon Nanotubes Decorated with Pt Nanocubes by a Noncovalent Functionalization Method and Their Role in Oxygen Reduction," Wen Yang et al. Advanced Materials 20 (2008), pp. 2579-2587.*

"Effects of Pt Particle Size on Hydrogen Storage on Pt-Doped Metal-Organic Framework IRMOF-8," Lifeng Wang et al. Journal of Physical Chemistry C (ACS Publications), 2011, 115, pp. 4793-4799.*

"Synthesis of nitrogen-doped onion-like carbon and its use in carbon-based CoFe binary non-precious-metal catalysts for oxygen-reduction," Gang Wu et al. Carbon 49 (2011), pp. 3972-3982.*

"Microscopic effects of the bonding configuration of nitrogen-doped graphene on its reactivity toward hydrogen peroxide reduction reaction," Ping Wu et al. Phys. Chem. Chem. Phys., 2013, 15, pp. 6920-6928.*

"One-step synthesis of PtPdAu ternary alloy nanoparticles on graphene with superior methanol electrooxidation activity," Yuzhen Zhang et al. Electrochimica Acta 56 (2011), pp. 8746-8751.*

"Effects of Acid Treatment of Pt—Ni Alloy Nanoparticles @ Graphene on the Kinetics of the Oxygen Reduction Reaction in Acidic and Alkaline Solutions," Ke Zhang et al. J. Phys. Chem. C 2011, 115, pp. 379-389.*

"Facile method to prepare Pd/graphene-polyaniline nanocomposite and used as new electrode material for electrochemical sensing," Zhixiang Zheng et al. Journal of Molecular Catalysis A: Chemical 353-354 (2012), pp. 80-86.*

(56) References Cited

OTHER PUBLICATIONS

"Twin-like ternary PtCoFe alloy in nitrogen-doped graphene nanopores as a highly effective electrocatalyst for oxygen reduction," Xing Zhong et al. Catalysis Science & Technology (2016), 6, pp. 5942-5948.*

"Nitrogen-Doped Graphene as Efficient Metal-Free Electrocatalyst for Oxygen Reduction in Fuel Cells," Liangti Qu et al. ACS Nano, vol. 4, No. 3 (2010), pp. 1321-1326.*

"File:Fc Diagram Pem.gif", retrieved on Oct. 20, 2014 from the Internet at <URL:http://web.archive.org/web/20100524225943/http://en.wikipedia.org/wiki/File:Fc_diagram_pem.gif>, last modified on Sep. 4, 2009, pp. 2.

Rod Borup et al., "Scientific Aspects of Polymer Electrolyte Fuel Cell Durability and Degradation", Chemical Reviews, 2007, pp. 3904-3951, vol. 107, No. 10.

M.A. García-Contreras et al., "Pt, PtCo and PtNi Electrocatalysts Prepared by Mechanical Alloying for the Oxygen Reduction Reaction in 0.5 M H2SO4", International Journal of Hydrogen Energy, Nov. 2008, pp. 6672-6680, vol. 33, No. 22.

Dongsheng Geng et al., "High Oxygen-Reduction Activity and Durability of Nitrogen-Doped Graphene", Energy & Environmental Science, 2011, pp. 760-764, vol. 4.

International Search Report and Written Opinion of the International Searching Authority, International Application No. PCT/IB2012/01523, dated Feb. 8, 2013.

R. Imran Jafri et al., "Nanostructured Pt Dispersed on Graphene-Multiwalled Carbon Nanotube Hybrid Nanomaterials as Electrocatalyst for PEMFC", Journal of the Electrochemical Society, 2010, pp. B874-B879, vol. 157, No. 6.

Jafri, R. I. et al., "Nitrogen Doped Graphene Nanoplatelets as Catalyst Support for Oxygen Reduction Reaction in Proton Exchange Membrane Fuel Cell", Journal of Materials Chemistry, 2010, pp. 7114-7117, vol. 20.

Gyubong Kim et al., "Carbon Monoxide-Tolerant Platinum Nanoparticle Catalysts on Defect-Engineered Graphene", ACS Nano, 2011, pp. 805-810, vol. 5, No. 2.

Adina Morozan et al., "Low-Platinum and Platinum-Free Catalysts for the Oxygen Reduction Reaction at Fuel Cell Cathodes", Energy & Environmental Science, 2011, pp. 1238-1254, vol. 4.

Nethravathi C. et al., "Highly Dispersed Ultrafine Pt and PtRu Nanoparticles on Graphene: Formation Mechanism and Electrocatalytic Activity", Nanoscale, 2011, pp. 569-571, vol. 3.

Sundara Ramaprabhu, "Development of Pt—Au-Graphene-Carbon Nanotube Composites for Fuel Cells and Biosensors Applications", Report No. AOARD-094040, Alternative Energy Technology Laboratory,Indian Institute of Technology Madras, Feb. 11, 2011, 19 pages.

A. Leela Mohana Reddy et al., "Pt/SWNT-Pt/C Nanocomposite Electrocatalysts for Proton-Exchange Membrane Fuel Cells", The Journal of Physical Chemistry C, 2007, pp. 16138-16146, vol. 111.

A. Leela Mohana Reddy et al., "Performance of Proton Exchange Membrane Fuel Cells Using Pt/MWNT-Pt/C Composites as Electrocatalysts for Oxygen Reduction Reaction in Proton Exchange Membrane Fuel Cells", Journal of Fuel Cell Science and Technology, Apr. 2010, pp. 7, vol. 7.

Brian Seger et al., "Electrocatalytically Active Graphene-Platinum Nanocomposites. Role of 2-D Carbon Support in PEM Fuel Cells", The Journal of Physical Chemistry C, 2009, pp. 7990-7995, vol. 113, No. 19.

Yiqing Sun et al., "Graphene based New Energy Materials", Energy & Environmental Science, 2011, pp. 1113-1132, vol. 4.

B.P. Vinayan et al., "Catalytic Activity of Platinum-Cobalt Alloy Nanoparticles Decorated Functionalized Multiwalled Carbon Nanotubes for Oxygen Reduction Reaction in PEMFC", International Journal of Hydrogen Energy, Jan. 2012, pp. 412-421, vol. 37, No. 1.

Hailiang Wang et al., "Nanocrystal Growth on Graphene with Various Degrees of Oxidation", J. Am. Chem. Soc., 2010, pp. 3270-3271, vol. 132, No. 10.

Dacheng Wei et al., "Synthesis of N-Doped Graphene by Chemical Vapor Deposition and Its Electrical Properties", Nano Letters, 2009, pp. 1752-1758, vol. 9, No. 5.

Lipeng Zhang et al., "Mechanisms of Oxygen Reduction Reaction on Nitrogen-Doped Graphene for Fuel Cells", The Journal of Physical Chemistry C, 2011, pp. 11170-11176, vol. 115, No. 22.

Chuan-Jian Zhong et al., "Fuel Cell Technology: Nano-Engineered Multimetallic Catalysts", Energy Environmental Science, 2008, pp. 454-466, vol. 1.

Chengzhou Zhu et al., "Layer-by-Layer Self-Assembly for Constructing a Graphene/Platinum Nanoparticle Three-Dimensional Hybrid Nanostructure using Ionic Liquid as a Linker", Langmuir, 2010, pp. 7614-7618, vol. 26, No. 10.

* cited by examiner

METAL-ALLOY GRAPHENE NANOCOMPOSITES AND METHODS FOR THEIR PREPARATION AND USE

CROSS-REFERENCE TO RELATED APPLICATIONS

The present application is a U.S. National Stage filing under 35 U.S.C. §371 of International Application PCT/IB2012/001523, filed on Aug. 8, 2012 and entitled "METAL-ALLOY GRAPHENE NANOCOMPOSITES AND METHODS FOR THEIR PREPARATION AND USE." The International Application claims priority to Indian Patent Application 1646/CHE/2012, filed on Apr. 26, 2012. The Indian Patent Application and the International Application, including any appendices or attachments thereof, are incorporated by reference herein in their entirety.

BACKGROUND

Proton exchange membrane fuel cells (PEMFCs) are used for a variety of mobile and transport applications owing to their substantially high energy conversion efficiency, low emissions and relatively low operating temperatures. In a typical PEMFC, hydrogen gas is supplied to the anode and oxygen gas is supplied to the cathode of the fuel cell. Hydrogen is oxidized to form protons while releasing electrons into an external circuit. Further, oxygen is reduced at the cathode to form reduced oxygen species. Protons travel across a proton-conducting membrane to the cathode to react with reduced oxygen species forming water.

A PEMFC employs a polymer membrane that is ionically conducting and electrically insulating in nature that channels the positive and negative charges during operation of the PEMFC. In order for the oxidation and reduction reactions in the fuel cell to occur at desired rates, electrocatalysts are required. Typically electrocatalysts are coated on the anode and cathode electrodes and a polymer electrolyte membrane is disposed between the anode and the cathode electrodes to form a membrane electrode assembly (MEA). Typically, PEMFCs use noble metals such as platinum as electrocatalysts to facilitate the fuel oxidation and oxidant reaction. Unfortunately, such electrocatalysts are substantially expensive and are not durable thereby inhibiting their use in large-scale applications of fuel cells.

Some PEMFCs use a combination of platinum and a transition metal such as iron, nickel and cobalt to enhance the oxygen reduction reaction (ORR) activity while reducing the overall amount of platinum in the electrocatalyst. However, the stability of such alloy electrocatalysts is substantially poor due to leaching of the transition metals in acid or alkaline media along with poor stability of the catalyst supporting material.

Moreover, current chemical reduction techniques such as sodium borohydride reduction and conventional ethylene glycol reduction used for reducing a metal precursor to nanoparticles take long time for reduction of the precursor. Moreover, these techniques do not provide complete reduction of the precursor resulting in agglomeration of the nanoparticles on the graphene surface. Other electrocatalyst supporting materials used in current PEMFCs include carbon nanotubes and graphitic mesoporous carbon. Again, high costs and low stability of such materials renders them unsuitable for certain applications.

Another electrocatalyst supporting material currently used for fuel cell applications is graphene. Typically, graphene surface is chemically modified to enable deposition of metal nanoparticles on the surface. Such surface modifications are performed using processes such as acid oxidation, ionic liquid linking and plasma treatments. However, most of these surface treatments result in destruction of the graphene structure leading to a decrease in its surface area and reduced electrical conductivity. Moreover, some of these surface treatment processes may often require additional steps before metal nanoparticles deposition on the graphene surface adding to the overall processing costs.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

Briefly, in accordance with one aspect, methods of forming a metal-alloy graphene nanocomposite are provided. The methods include providing a graphene substrate and forming a conducting polymer layer on a first major surface of the graphene substrate. The methods also include pyrolyzing the conducting polymer layer to form a nitrogen-doped graphene substrate and dispersing a plurality of metal-alloy nanoparticles on a first surface of the nitrogen-doped graphene substrate to form the nanocomposite.

In accordance with another aspect, metal-alloy graphene nanocomposites are provided. The metal-alloy graphene nanocomposites can include a nitrogen-doped graphene substrate and a plurality of metal-alloy nanoparticles dispersed on a first major surface of the nitrogen-doped graphene substrate.

In accordance with another aspect, electrocatalysts are provided. The electrocatalysts can include a nitrogen-doped graphene substrate and a plurality of platinum-cobalt alloy nanoparticles dispersed on a first major surface of the nitrogen-doped graphene substrate.

In accordance with another aspect, electrocatalysts are provided. The electrocatalysts can be formed by providing a nitrogen-doped graphene substrate and dispersing a plurality of platinum-cobalt alloy nanoparticles on a first surface of the nitrogen-doped graphene substrate.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

It will also be understood that any compound, material or substance which is expressly or implicitly disclosed in the specification and/or recited in a claim as belonging to a group or structurally, compositionally and/or functionally related compounds, materials or substances, includes individual representatives of the group and all combinations thereof.

Example embodiments are generally directed to composites comprising graphene and metal-alloy nanoparticles and use of such composites as electrocatalysts in fuel cell applications. The present technique provides a simple, cost-effective and non-toxic process for electrocatalyst synthesis suitable for use in proton exchange membrane fuel cells (PEMFC) used in automotive and mobile applications, among others.

Figure 1:
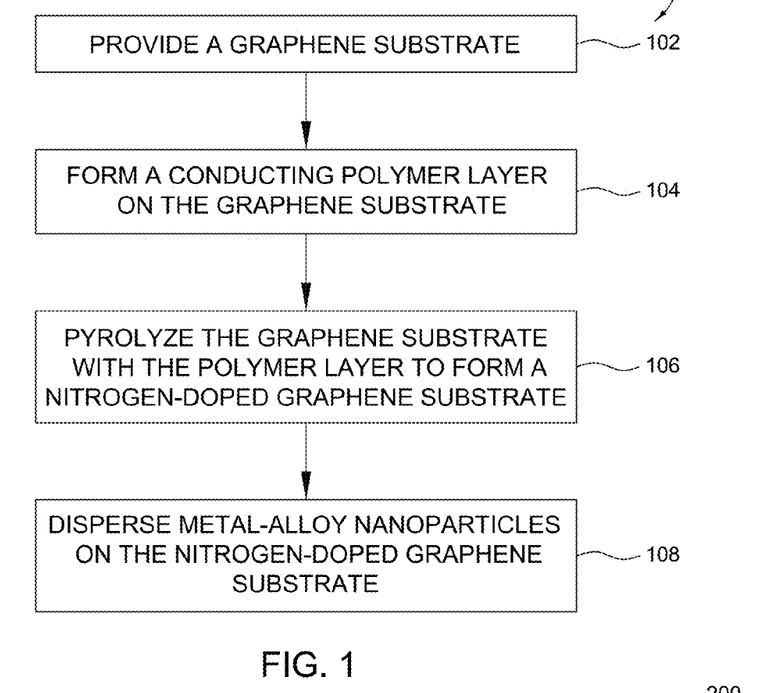
FIG. 1 is an example flow diagram of an embodiment of a method of forming a metal-alloy graphene nanocomposite.

Referring now to FIG. 1, an example flow diagram 100 of an embodiment of a method of forming a metal-alloy graphene nanocomposite is illustrated. At block 102, a graphene substrate is provided. A conducting polymer layer is formed on a first major surface of the graphene substrate (block 104). The conducting polymer layer may include, for example, polypyrrole (PPy), polyaniline (PANI), polycarbazole, polyindole, polyazepine, or combinations thereof. In this example embodiment, the graphene substrate is functionalized with a negatively charged polyelectrolyte to form a functionalized graphene substrate.

Examples of the negatively charged polyelectrolyte include, but are not limited to, poly(sodium 4-styrene sulfonate) (PSSS), sodium polyacrylate, polyanetholesulfonic acid sodium salt, poly(2-acrylamido-2-methyl-1-propanesulfonic acid-co-acrylonitrile), poly(2-acrylamido-2-methyl-1-propanesulfonic acid) solution, poly(vinyl sulfate) potassium salt, poly(vinylsulfonic acid, sodium salt) solution, 4-styrenesulfonic acid sodium salt hydrate, poly(4-styrenesulfonic acid-co-maleic acid) sodium salt solution, or combinations thereof.

Moreover, the functionalized graphene substrate is polymerized using a polymerizable heterocyclic aromatic compound to form a positively charged conducting polymer layer on the graphene substrate. Examples of the polymerizable heterocyclic aromatic compound include, but are not limited to, pyrrole, aniline, carbazole, indole, azepine, or combinations thereof. Moreover, the conducting polymer layer may include polypyrrole (PPy), polyaniline (PANI), polycarbazole, polyindole, polyazepine, or combinations thereof. At block 106, the graphene substrate with the conducting polymer layer is pyrolyzed to form a nitrogen-doped graphene substrate.

A plurality of metal-alloy nanoparticles is dispersed on a first surface of the nitrogen-doped graphene substrate to form the nanocomposite (block 108). The metal-alloy nanoparticles may be dispersed on the nitrogen-doped graphene substrate by a polyol reduction technique. However, other suitable deposition techniques may be used. In one example embodiment, the metal-alloy nanoparticles include a combination of platinum (Pt) and an alloying transition metal. In one embodiment, the alloying transition metal includes a 3d transition metal. Examples of the 3d transition metal include cobalt (Co), iron (Fe), nickel (Ni), or combinations thereof.

Figure 2:
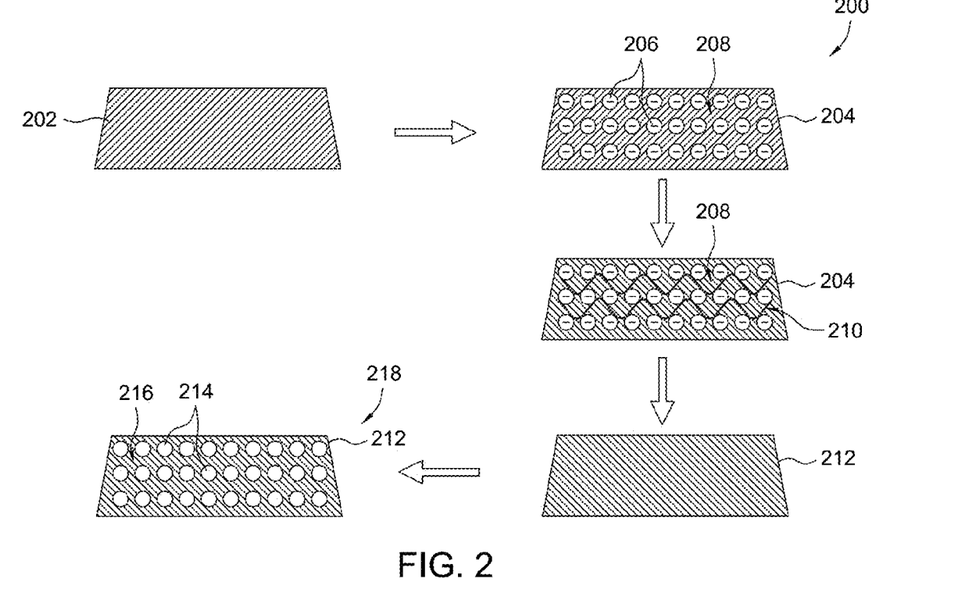
FIG. 2 illustrates materials and/or compositions used/formed at different stages of forming a metal-alloy graphene nanocomposite.

FIG. 2 illustrates materials and/or compositions 200 used/formed at different stages of forming a metal-alloy graphene nanocomposite. In the illustrated embodiment, a graphene substrate 202 is functionalized with a negatively charged polyelectrolyte to form a functionalized graphene substrate 204. In this example embodiment, the negatively charged polyelectrolyte includes PSSS and the functionalized graphene substrate 204 includes PSSS-functionalized graphene substrate. The functionalization of the graphene substrate 202 provides negative charge (generally represented by reference numeral 206) on a first major surface 208 of the PSSS-functionalized graphene substrate 204.

The PSSS-functionalized graphene substrate 204 is then polymerized using a polymerizable heterocyclic aromatic compound to form a positively charged conducting polymer layer 210 on the surface 208 of the PSSS-functionalized graphene substrate 204. In this example embodiment, the polymerizable heterocyclic aromatic compound includes pyrrole and the conducting polymer layer 210 includes polypyrrole (PPy). It should be noted that the electrostatic interaction of the positively charged polypyrrole (PPy) 210 and the negatively charged PSSS-functionalized graphene substrate 204 facilitates substantially uniform coating of polypyrrole over the surface 208 of the PSSS-functionalized graphene substrate 204.

The PSSS-functionalized graphene substrate 204 with the coating of polypyrrole 210 is then pyrolyzed to form a nitrogen-doped graphene substrate 212. In the illustrated embodiment, the PSSS-functionalized graphene substrate 204 is heated in presence of an inert gas to form the nitrogen-doped graphene substrate 212. In this example embodiment, the PSSS-functionalized graphene substrate 204 with the coating of polypyrrole 210 is heated in presence of argon gas at a temperature of about 600° C. to about 800° C. to form the nitrogen-doped graphene substrate 212. However, other inert gases may be used.

The PSSS-functionalized graphene substrate 204 with the coating of polypyrrole 210 is heated for about 1 hour to about 2 hours to form the nitrogen-doped graphene substrate 212. The heating of the PSSS-functionalized graphene substrate 204 facilitates removal of the PPy polymer 210 from the graphene surface and doping the substrate 204 with nitrogen atoms. In certain example embodiments, an atomic percentage of nitrogen in the nitrogen-doped graphene substrate 212 is about 4% to about 8%. In one example embodiment, the atomic percentage of nitrogen in the nitrogen-doped graphene substrate 212 is about 6%.

It should be noted that these technique of doping the graphene substrate with nitrogen atoms provides substantial control over nitrogen content in graphene without changing its surface area. The technique also provides enhanced electrical conductivity and catalytic activity for the graphene substrate. Moreover, this doping technique is cost-effective, non-toxic and readily applicable for other carbon based materials.

A plurality of metal-alloy nanoparticles 214 are then dispersed on a first surface 216 of the nitrogen-doped graphene substrate 212 to form a metal-alloy graphene nanocomposite 218. In one example embodiment, the metal-alloy nanoparticles 214 include a combination of platinum (Pt) and an alloying transition metal. In one embodiment, the alloying transition metal includes a 3d transition metal. Examples of the 3d transition metal include cobalt (Co), iron (Fe), nickel (Ni), or combinations thereof.

In the illustrated embodiment, the metal-alloy nanoparticles 214 include platinum and cobalt having an atomic ratio of about 3:1. The platinum-cobalt alloy nanoparticles 214 are dispersed on the nitrogen-doped graphene substrate 212 by a microwave polyol reduction technique using ethylene glycol, chloroplatinic acid ($H_2PtCl_6$) and cobalt nitrate ($Co(NO_3)_2$). As will be appreciated by one skilled in the art other suitable deposition techniques and/or suitable reducing agents may be used for dispersing the metal-alloy nanoparticles 214 on the nitrogen-doped graphene substrate 212. The reduction technique ensures complete utilization of the platinum precursor and facilitates control over the amount of nanoparticles loading and the particle size of the platinum-cobalt alloy nanoparticles 214.

In another embodiment, platinum-iron alloy nanoparticles are dispersed on the nitrogen-doped graphene substrate 212 by the microwave polyol reduction technique using ferric chloride ($FeCl_3$) precursor along with hexachloroplatinic acid ($H_2PtCl_6.6H_2O$) precursor to prepare $Pt_3Fe$/N-G nanoparticles on the nitrogen-doped graphene substrate 212. In this embodiment, the amounts of the initial precursors are controlled to form the nanoparticles with platinum and iron having an atomic ratio of about 3:1.

It should be noted that nitrogen doping of the graphene substrate facilitates high dispersion of the metal-alloy nanoparticles 214 on the substrate 202. In this example embodiment, the platinum-cobalt alloy nanoparticles 214 are dispersed on the nitrogen-doped graphene substrate 212 within about 90 seconds. Moreover, an average size of the platinum-cobalt alloy nanoparticles is about 2.2 nanometers to about 2.8 nanometers and the weight of the nanoparticles 214 is about 30% of the total weight of the nanocomposite 218.

The metal-alloy graphene nanocomposite 218 formed using the present technique may be configured as an electrocatalyst for use in a PEMFC. The present technique of forming the conducting polymer layer on the graphene substrate may be used for forming a uniform layer over a surface of various carbon nanostructures and such composites may be used in conductive adhesives, electromagnetic shielding applications, sensors, rechargeable batteries, molecular electronics, electric displays, smart structures and aircraft structures.

Moreover, nitrogen-doped graphene formed using the present technique may be used in a variety of applications such as solar cells, lithium-ion batteries, sensors, fuel cells and bio applications. In addition, the metal-alloy graphene nanocomposite described above may be used in PEMFCs for automotive and mobile applications.

EXAMPLES

The present invention will be described below in further detail with examples and comparative examples thereof, but it is noted that the present invention is by no means intended to be limited to these examples.

Figure 3:
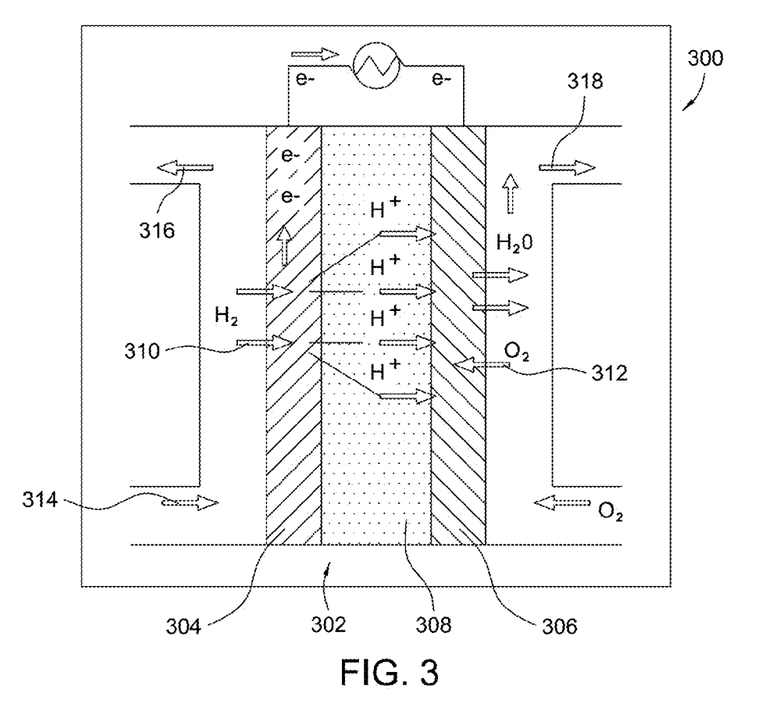
FIG. 3 illustrates an example configuration of a PEMFC assembled with a platinum-cobalt alloy graphene nanocomposite used in a membrane electrode assembly (MEA) of the PEMFC.

Example 1: Configuration of a PEMFC with a Metal-Alloy Graphene Nanocomposite Electrocatalyst FIG. 3 illustrates an example configuration 300 assembled with the platinum-cobalt alloy graphene nanocomposite 218 used in a membrane electrode assembly (MEA) 302 of the PEMFC 300. The platinum-cobalt alloy graphene nanocomposite 218 was formed using the technique described with reference to FIGS. 1 and 2.

In particular, the platinum-cobalt alloy graphene nanocomposite 218 was formed by costing the PSSS-functionalized graphene substrate 204 with polypyrrole 210 and subsequently pyrolyzing the graphene substrate 204 with polypyrrole 210 to form the nitrogen-doped graphene substrate 212. Moreover, the platinum-cobalt alloy nanoparticles 214 were dispersed on the nitrogen-doped graphene substrate 212. The platinum-cobalt alloy nanoparticles 214 included platinum and cobalt in an atomic ratio of about 3:1.

In the MEA 302, the anode 304 and the cathode 306 included a backing layer, a gas diffusion layer and a catalyst layer. The catalyst layer was prepared with about 5 wt % Nafion solution uniformly coated over the gas diffusion layer using brush painting. Moreover, platinum loadings of about 0.25 mg cm$^{-2}$ and about 0.4 mg cm$^{-2}$ were maintained at the anode 304 and the cathode 306, respectively. Here, an effective electrode area was about 11.56 cm$^{-2}$.

The MEA 302 was prepared by placing a pre-treated Nafion 212 CS membrane 308 between the anode 304 and the cathode 306. The pre-treated Nafion 212 CS membrane 308 was placed by hot-pressing at a temperature of about 130° C. and a pressure of about 70 bar for about 4 minutes. The MEA 302 was tested in a fuel cell test station by fixing it between two graphite plates, which had a provision for gas flow.

In operation, gas streams of pure hydrogen gas ($H_2$) 310 and oxygen gas ($O_2$) 312 were introduced on the anode 304 and cathode 306 sides and were controlled by respective mass flow controllers and the flow rates were maintained at about 100 standard cubic centimeters per minute (sccm). Hydrogen 310 and oxygen 312 gases were humidified using humidifiers before feeding them into the anode 304 and the cathode 306 sides, respectively. A fuel 314 such as including methanol and water was supplied on the anode 304 side and carbon dioxide and water were discharged thereon.

Following the reaction, the excess fuel along with water and heat were removed from the fuel cell 300, as represented by reference numerals 316 and 318. Subsequently, fuel cell measurements were performed using the fuel cell test station. The performance of the fuel cell was studied at three different temperatures of about 40° C., 50° C., and 60° C. respectively and a relative humidity of about 90% without any back pressure.

Example 2: Characterization of the Electrocatalyst Used in the Fuel Cell of Example 1

Figure 4:
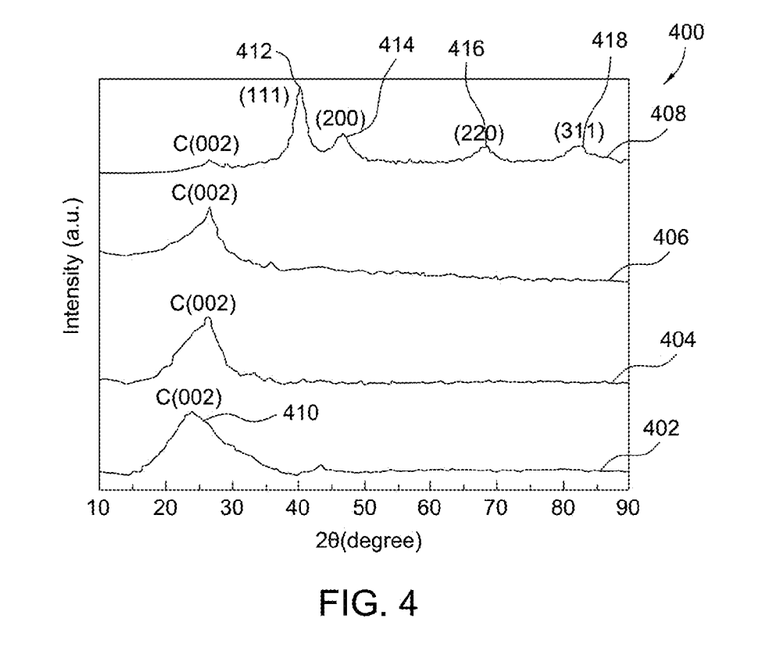
FIG. 4 illustrates X-ray diffractograms of the electrocatalyst used in the fuel cell of FIG. 3.

FIG. 4 illustrates X-ray diffractograms 400 of the electrocatalyst used in the fuel cell 300 of Example 1. The X-ray diffractograms obtained for the PSSS-functionalized graphene substrate 204 and the PSSS-functionalized graphene substrate 204 with the coating of polypyrrole (PPy) 210 are represented by reference numerals 402 and 404 respectively.

Moreover, X-ray diffractograms obtained for nitrogen-doped graphene substrate 212 and the platinum-cobalt alloy graphene nanocomposite 218 are represented by reference numerals 406 and 408 respectively. As can be seen, a broad feature of (002) graphite peak (represented by reference numeral 410) for the PSSS-functionalized graphene substrate 204 was indicative of a loss of the long range order of the sample.

After uniform coating with the conducting polymer PPy 210, the PSSS-functionalized graphene substrate 204 still retained its amorphous structure. The heating of the PSSS-functionalized graphene substrate 204 with the coating of PPy 210 at about 800° C. in argon atmosphere resulted in removal of the PPy polymer 210 from the graphene surface 208 and doped it with nitrogen atoms.

Moreover, as can been from the X-ray diffractogram 408 of the platinum-cobalt alloy graphene nanocomposite 218, the presence of peaks 412, 414, 413 and 418 at (111), (200), (220), (311) planes respectively indicated that platinum and cobalt precursors were completely reduced to platinum-cobalt alloy nanoparticles 214. Here, Scherrer's formula was used to determine the crystallite size of the platinum-cobalt alloy nanoparticles 214 and the particle size of the platinum-cobalt alloy nanoparticles 214 was measured to be about 2.6 nm.

Figure 5:
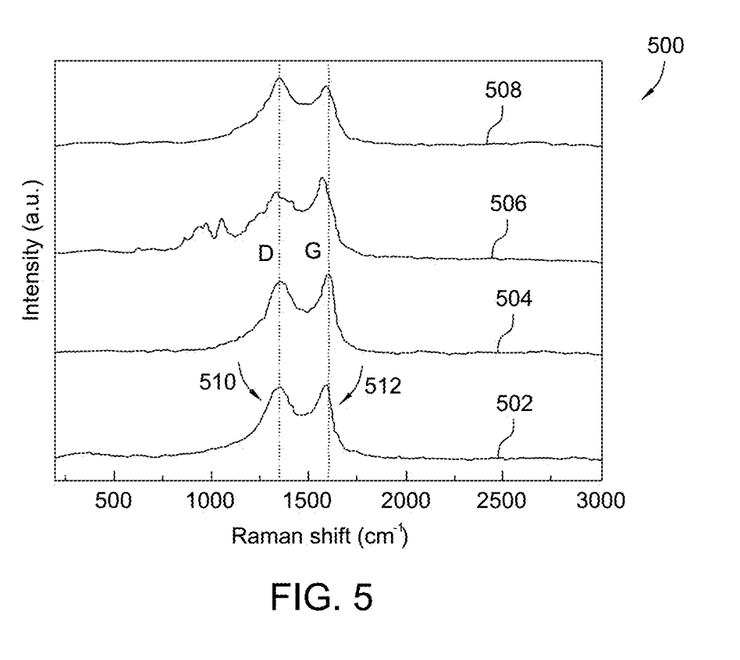
FIG. 5 is an example X-ray Raman spectra of components of the electrocatalyst used in the fuel cell of FIG. 3.

FIG. 5 is an example X-ray Raman spectra 500 of components of the electrocatalyst used in the fuel cell of Example 1. The X-ray Raman spectra obtained for the graphene substrate 202 and the PSSS-functionalized graphene substrate 204 are represented by reference numerals 502 and 504 respectively. Moreover, X-ray Raman spectra obtained for the PSSS-functionalized graphene substrate 204 with the coating of polypyrrole (PPy) 210 and the nitrogen-doped graphene substrate 212 are represented by reference numerals 506 and 508 respectively.

As can be seen, a broad D-bend 510 with intensity comparable to that of the G-band 512 for the graphene substrate 202 indicated the presence of defects within the graphene substrate 202. Moreover, a ratio between the intensities of the D and G bands was used to predict the presence of defects in the samples. The intensity ratio of the D-band to the G-band was substantially low for the PSSS-functionalized graphene substrate 204, indicating coverage of the defects of graphene substrate 202 by PSSS polyelectrolyte chains.

In PSSS-functionalized graphene substrate 204 coated with PPy 210, the presence of the additional peaks at about 1052 cm$^{-1}$, 979 cm$^{-1}$ and 927 cm$^{-1}$ respectively along with graphene peaks (G and D bend) indicated the uniform coating of the graphene surface 204 with PPy 210.

Moreover, absence of these peaks in the nitrogen-doped graphene substrate 212 indicated that all polymer content was removed from the graphene surface 212 after heating at the temperature of about 800° C. in argon atmosphere. The increase in intensity of D band in nitrogen-doped graphene substrate 212 indicated the nitrogen doping of the graphene substrate.

Figure 6:
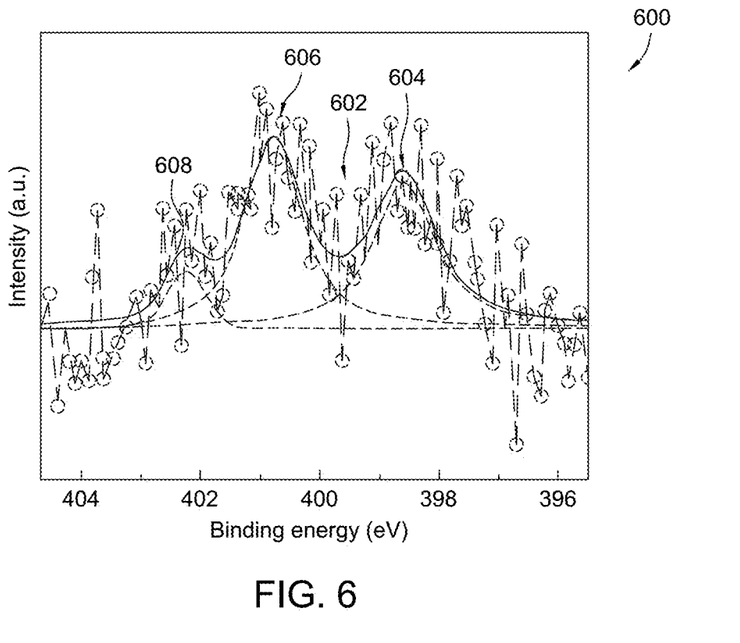
FIG. 6 is an example X-ray photon spectroscopy (XPS) spectra of the nitrogen-doped graphene substrate of the electrocatalyst used in the fuel cell of FIG. 3.

FIG. 6 is an example X-ray photon spectroscopy (XPS) spectra 600 of the nitrogen-doped graphene substrate 212 of the electrocatalyst 218 used in fuel cell of Example 1. The amount of nitrogen incorporated in the nitrogen-doped graphene substrate 212 was measured to be about 6 atomic % from the X-ray photon spectroscopy (XPS) spectra 600. As can be seen, the binding energy 602 centered about 400 cV corresponds to the N 1s region. Moreover, the binding energy 604 centered at about 398.7 cV corresponds to pyridinic nitrogen and the binding energy 606 centered at about 400.8 eV corresponds to pyrrolic nitrogen. Furthermore, the binding energy 608 centered at about 402.2 eV corresponds to quaternary nitrogen.

Example 3: Surface Morphology Patterns of Layer of the Electrocatalyst of Example 1

Figure 7:
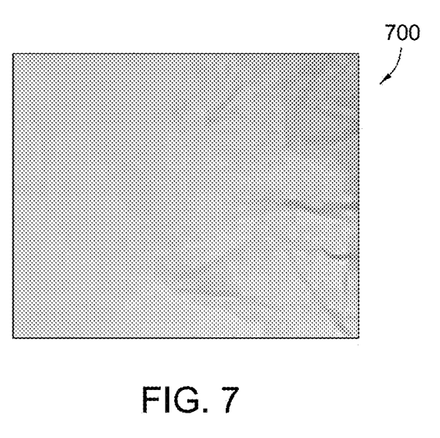
FIG. 7 is a transmission electron microscope (TEM) image of the PSSS-functionalized graphene substrate of the electrocatalyst used in the fuel cell of FIG. 3.
Figure 8:
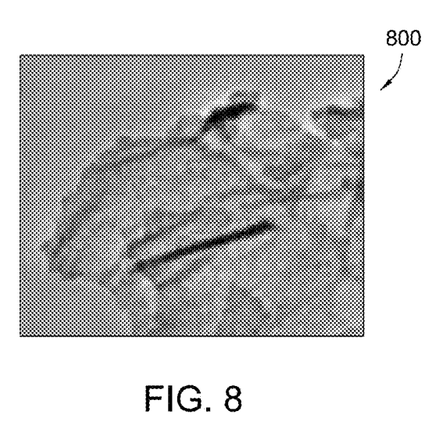
FIG. 8 is a TEM image of the PSSS-functionalized graphene substrate coated with PPy of the electrocatalyst used in the fuel cell of FIG. 3.
Figure 9:
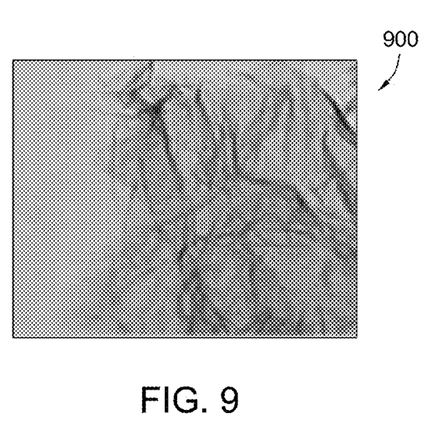
FIG. 9 is a TEM image of the nitrogen-doped graphene substrate of the electrocatalyst used in the fuel cell of FIG. 3.
Figure 10:
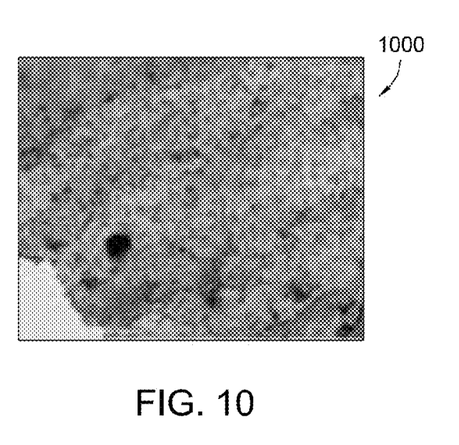
FIG. 10 is a TEM image of the platinum-cobalt alloy graphene nanocomposite of the electrocatalyst used in the fuel cell of FIG. 3.

FIG. 7 is a transmission electron microscope (TEM) image 700 of the PSSS-functionalized graphene substrate 204 of the electrocatalyst 218 used in fuel cell of Example. 1. FIG. 8 is a TEM image 800 of the PSSS-functionalized graphene substrate 204 coated with PPy 210 of the electrocatalyst 218 used in fuel cell of Example. 1. Further. FIG. 9 is a TEM image 900 of the nitrogen-doped graphene substrate 212 of the electrocatalyst 218 used in fuel cell of Example. 1 and FIG. 10 is a TEM image 1000 of the platinum-cobalt alloy graphene nanocomposite 218 of the electrocatalyst 218 used in fuel cell of Example. 1.

The uniform costing of the conducting polymer PPy 210 over the surface of the PSSS-functionalized graphene substrate 204 was seen from the TEM image 800. This uniform coating was achieved owing to strong electrostatic interaction of the positively charged conducting polymer PPy 210 and negatively charged PSSS-functionalized graphene surface 204.

Moreover, the TEM image 900 of nitrogen-doped graphene substrate 212 demonstrated that the conducting polymer layer 210 was removed from the graphene surface 212 after heating at 800° C. in argon atmosphere. Further, a uniform distribution of platinum-cobalt alloy nanoparticles 214 over the surface of nitrogen-doped graphene substrate 212 was observed from the TEM image 1000. The particle sizes of platinum-cobalt alloy nanoparticles 214 obtained from TEM analysis were estimated and an average particle size of the nanoparticles 214 was estimated to be about 2.6 nm. As can be seen, the nitrogen doping of the graphene substrate 202 facilitates substantially high dispersion of the nanoparticles 214 on the graphene substrate 202 and achieves relatively small particle size of the platinum-cobalt alloy nanoparticles 214.

Figure 11:
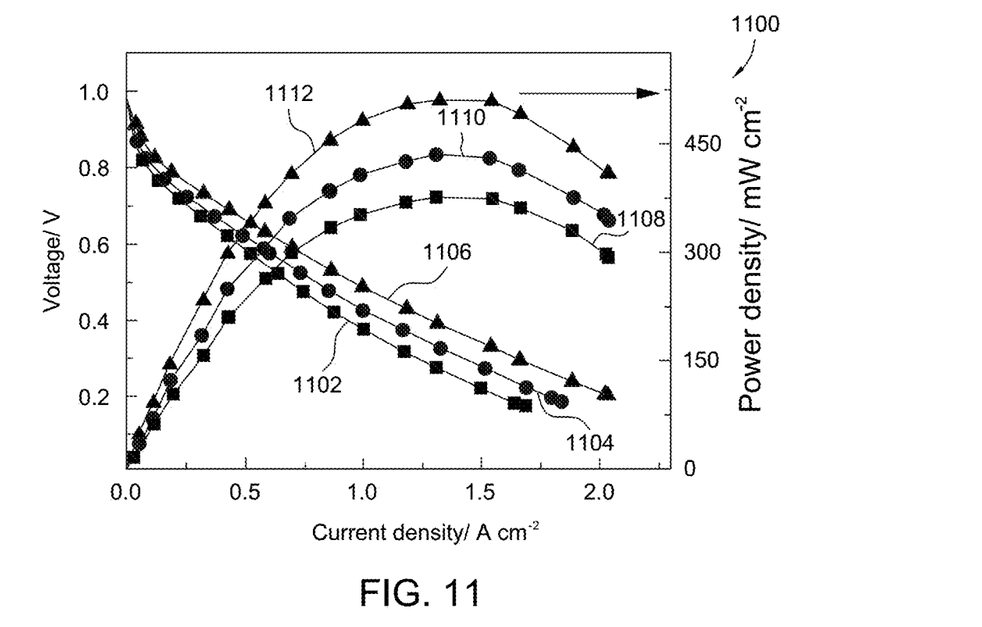
FIG. 11 is an example polarization curve of a cathode electrocatalyst with platinum nanoparticles dispersed on a nitrogen-doped graphene substrate and using platinum-carbon as the anode electrocatalyst.

Example 4: Polarization Curves of Cathode Electrocatalysts Using Platinum Graphene Nanocomposite and Platinum-Cobalt Metal Alloy Graphene Nanocomposite FIG. 11 is an example polarization curve 1100 of a cathode electrocatalyst with platinum nanoparticles dispersed on a nitrogen-doped graphene substrate and using platinum-carbon as the anode electrocatalyst. The polarization curves 1100 were generated at temperatures of about 40° C., 50° C. and 60° C. respectively without applying any back pressure. Here, the curves for current density at temperatures of about 40° C., 50° C. and 60° C. are represented by reference numerals 1102, 1104 and 1106 respectively.

Further, the curves for power density at temperatures of about 40° C., 50° C. and 60° C. are represented by reference numerals 1108, 1110 and 1112 respectively. As can be seen, the maximum current density for the electrocatalyst is about 750 mA cm$^{-2}$ measured at a potential of 0.5 Volts. Moreover, the maximum power density for the electrocatalyst 218 achieved at the temperature of 60° C. is about 512 mW cm$^{-2}$.

Figure 12:
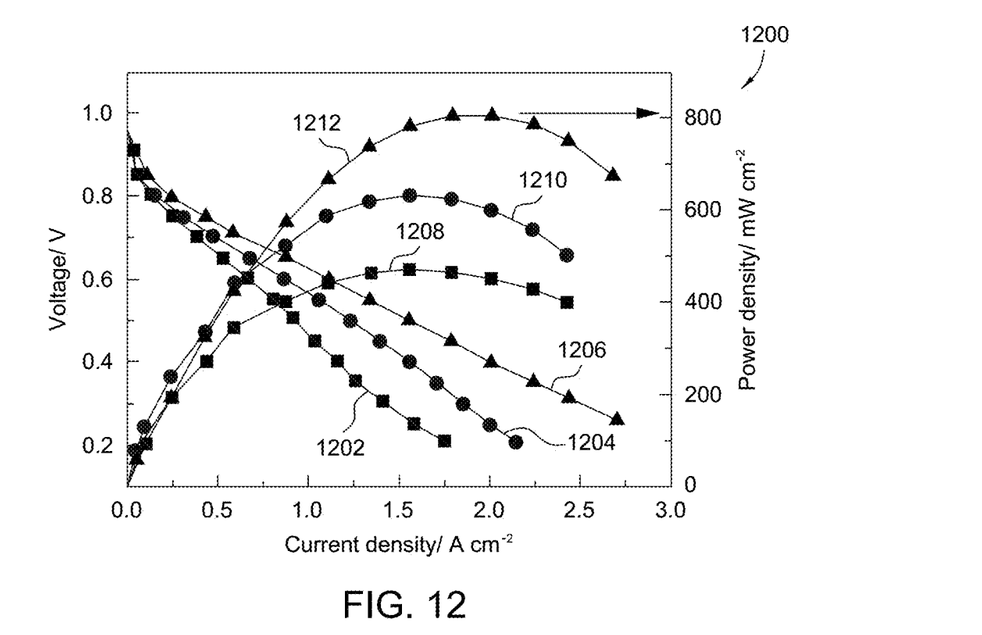
FIG. 12 is an example polarization curve of a cathode electrocatalyst with the platinum-cobalt alloy graphene nanocomposite.

FIG. 12 is an example polarization curve 1200 of a cathode electrocatalyst with the platinum-cobalt alloy graphene nanocomposite of Example 1. Here, platinum-carbon was utilized as the anode electrocatalyst. The polarization curves 1200 were generated at temperatures of about 40° C., 50° C. and 60° C. respectively without applying any back pressure. The curves for current density at temperatures of about 40° C., 50° C. and 60° C. are represented by reference numerals 1202, 1204 and 1206 respectively.

Further, the curves for power density at temperatures of about 40° C., 50° C. and 60° C. are represented by reference numerals 1208, 1210 and 1212 respectively. Here, the maximum current density for the electrocatalyst is about 1560 mA cm$^{-2}$ measured at a potential of 0.5 Volts. Moreover, the maximum power density measured for the electrocatalyst achieved at the temperature of 60° C. is about 805 mW cm$^{-2}$. Thus, the platinum-cobalt alloy graphene nanocomposite has substantially enhanced catalytic performance as compared to the existing commercial electrocatalysts.

Figure 13:
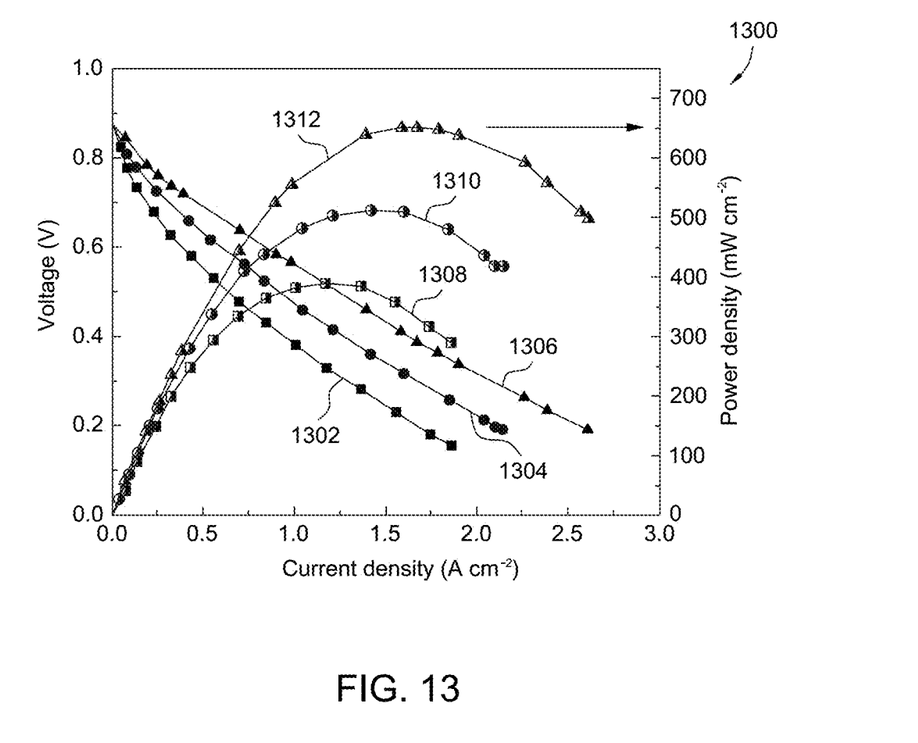
FIG. 13 is an example polarization curve of cathode electrocatalysts with platinum-iron alloy nanoparticles dispersed on a nitrogen-doped graphene substrate with platinum-carbon (Pt/C) as anode electrocatalyst.

FIG. 13 is an example polarization curve 1300 of a cathode electrocatalyst with platinum-iron alloy nanoparticles dispersed on a nitrogen-doped graphene substrate with platinum-carbon (Pt/C) as the anode electrocatalyst. The polarization curves 1300 were generated at temperatures of about 40° C., 50° C. and 60° C. respectively without applying any back pressure. Here, the curves for current density at temperatures of about 40° C., 50° C. and 60° C. are represented by reference numerals 1302, 1304 and 1306 respectively.

Further, the curves for power density at temperatures of about 40° C., 50° C. and 60° C. are represented by reference numerals 1308, 1310 and 1312 respectively. As can be seen, the maximum power density measured for the electrocatalyst achieved at the temperature of 60° C. is about 651 mWcm$^{-2}$ which is again substantially higher as compared to the commercially available electrocatalysts. As will be appreciated by those skilled in the art the metal-alloy nanoparticles graphene nanocomposites formed using the technique described herein has substantially enhanced electrocatalytic performance as compared to the existing commercial electrocatalysts.

Figure 14:
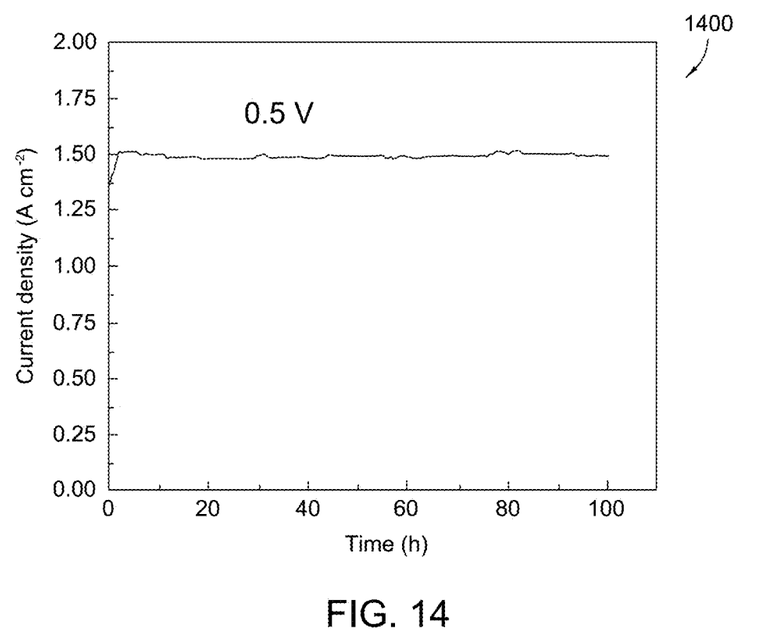
FIG. 14 illustrates example results for stability tests performed on the metal-alloy nanoparticles graphene nanocomposite used as an electrocatalyst in a fuel cell.
Figure 15:
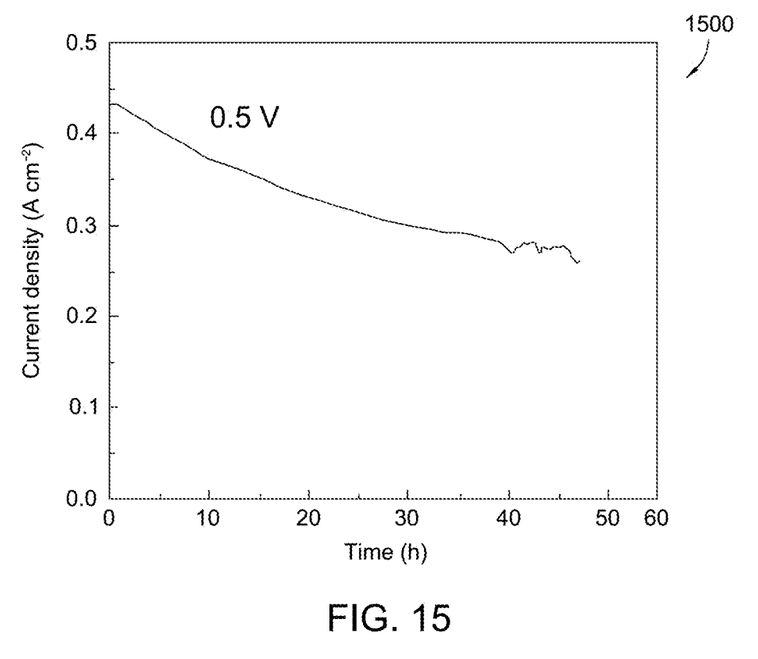
FIG. 15 illustrates example results for stability tests performed on commercially available platinum-carbon electrocatalyst.

Example 4: Comparative Results of Stability Tests Performed on the Platinum-Cobalt Metal Alloy Graphene Electrocatalyst Described Above Relative to Existing Electrocatalysts The electrocatalyst described herein was observed to be substantially stable. FIGS. 14 and 15 are stability test results for the metal-alloy nanoparticles graphene nanocomposite (1400) and a commercially available platinum-carbon electrocatalyst (1500). Here, a stability run was performed for the platinum-cobalt alloy graphene nanocomposite used as an electrocatalyst and for a commercially available E-TEK platinum-carbon electrocatalyst for a period of about hours at a potential of about 0.5 V. As can be seen from current density profiles 1400 and 1500, a fuel cell assembled using the platinum-cobalt metal alloy graphene electrocatalyst was substantially stable over the testing period as indicated by the substantially horizontal line in 1400 showing consistent current density over time. The commercial E-TEK Pt/C electrocatalyst, on the other hand, showed an almost immediate and gradual decline in current density over time as indicated by the downward sloped line in 1500.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method of forming a metal-alloy graphene nanocomposite, the method comprising:
    providing a graphene substrate;
    forming a conducting polymer layer on a first major surface of the graphene substrate;
    pyrolyzing the conducting polymer layer to form a nitrogen-doped graphene substrate; and
    dispersing a plurality of metal-alloy nanoparticles on a first surface of the nitrogen-doped graphene substrate to form the nanocomposite.

2. The method of claim 1, wherein the conducting polymer layer comprises polypyrrole (PPy), polyaniline (PANI), polycarbazole, polyindole, polyazepine, or combinations thereof.

3. The method of claim 1, wherein the plurality of metal-alloy nanoparticles comprises a combination of platinum (Pt) and an alloying transition metal.

4. The method of claim 3, wherein the alloying transition metal is a 3d transition metal.

5. The method of claim 3, wherein the alloying transition metal comprises cobalt (Co), iron (Fe), nickel (Ni), or combinations thereof.

6. The method of claim 1, wherein forming the conducting polymer layer comprises:
    functionalizing the graphene substrate with a negatively charged polyelectrolyte to form a functionalized graphene substrate; and
    polymerizing the functionalized graphene substrate using a polymerizable heterocyclic aromatic compound to form a positively charged conducting polymer layer on the graphene substrate.

7. The method of claim 6, wherein the negatively charged polyelectrolyte comprises poly(sodium 4-styrene sulfonate) (PSSS), sodium polyarylate, polyanetholesulfonic acid sodium salt, poly(2-acrylamido-2-methyl-1-propanesulfonic acid-co-acrylonitrile), poly(2-acrylamido-2-methyl-1-propanesulfonic acid) solution, poly(vinyl sulfate) potassium salt, poly(vinylsulfonic acid, sodium salt) solution, 4-styrenesulfonic acid sodium salt hydrate, poly(4-styrenesulfonic acid-co-maleic acid) sodium salt solution, or combinations thereof.

8. The method of claim 6, wherein the polymerizable heterocyclic aromatic compound comprises pyrrole, aniline, carbazole, indole, azepine, or combinations thereof.

9. The method of claim 1, wherein pyrolyzing the conducting polymer layer comprises heating the graphene substrate with the polymer layer in presence of an inert gas to form the nitrogen-doped graphene substrate.

10. The method of claim 1, wherein the plurality of metal-alloy nanoparticles is dispersed on the nitrogen-doped graphene substrate by a polyol reduction technique in presence of a reducing agent.

11. A method of forming a metal-alloy graphene nanocomposite, the method comprising:
    providing a graphene substrate;
    functionalizing the graphene substrate with a negatively charged polyelectrolyte to form a functionalized graphene substrate;
    polymerizing the functionalized graphene substrate using a polymerizable heterocyclic aromatic compound to form a positively charged conducting polymer layer on the graphene substrate; and
    pyrolyzing the conducting polymer layer to form a nitrogen-doped graphene substrate.

12. The method of claim 11, further comprising dispersing a plurality of metal-alloy nanoparticles on a first major surface of the nitrogen-doped graphene substrate to form the nanocomposite.

13. The method of claim 11, wherein the conducting polymer layer comprises polypyrrole (PPy), polyaniline (PANI), polycarbazole, polyindole, polyazepine, or combinations thereof.

14. The method of claim 11, wherein the negatively charged polyelectrolyte comprises poly(sodium 4-styrene sulfonate) (PSSS), sodium polyacrylate, polyanetholesulfonic acid sodium salt, poly(2-acrylamido-2-methyl-1-propanesulfonic acid-co-acrylonitrile), poly(2-acrylamido-2-methyl-1-propanesulfonic acid) solution, poly(vinyl sulfate) potassium salt, poly(vinylsulfonic acid, sodium salt) solution, 4-styrenesulfonic acid sodium salt hydrate, poly(4-styrenesulfonic acid-co-maleic acid) sodium salt solution, or combinations thereof.

15. The method of claim 11, wherein the polymerizable heterocyclic aromatic compound comprises pyrrole, aniline, carbazole, indole, azepine, or combinations thereof.

16. The method of claim 11, wherein pyrolyzing the conducting polymer layer comprises heating the graphene substrate with the polymer layer in presence of an inert gas to form the nitrogen-doped graphene substrate.

17. A metal-alloy graphene nanocomposite comprising:
a nitrogen-doped graphene substrate; and
a plurality of metal-alloy nanoparticles dispersed on a first major surface of the nitrogen doped graphene substrate,
wherein the nitrogen-doped graphene substrate is formed by coating a conducting polymer layer on a first major surface of a graphene substrate and pyrolyzing the conducting polymer layer to form the nitrogen-doped graphene substrate.

18. The metal-alloy graphene nanocomposite of claim 17, wherein the conducting polymer layer comprises polypyrrole (PPy), polyaniline (PANI), polycarbazole, polyindole, polyazepine, or combinations thereof.

19. The metal-alloy graphene nanocomposite of claim 17, wherein an atomic percentage of nitrogen in the nitrogen-doped graphene substrate is about 4% to about 8%.

20. The metal-alloy graphene nanocomposite of claim 19, wherein the atomic percentage of nitrogen in the nitrogen-doped graphene substrate is about 6%.

21. The metal-alloy graphene nanocomposite of claim 17, wherein the plurality of metal-alloy nanoparticles comprises a combination of platinum (Pt) and an alloying transition metal.

22. The metal-alloy graphene nanocomposite of claim 21, wherein the alloying transition metal comprises cobalt (Co), iron (Fe), nickel (Ni), or combinations thereof.

23. The metal-alloy graphene nanocomposite of claim 21, wherein the plurality of metal-alloy nanoparticles comprises platinum and cobalt having an atomic ratio of about 3:1.

24. The metal-alloy graphene nanocomposite of claim 17, wherein the nanocomposite is configured as an electrocatalyst for use in a proton exchange membrane fuel cell (PEMFC).

25. An electrocatalyst, comprising:
a nitrogen-doped graphene substrate; and
a plurality of platinum-cobalt alloy nanoparticles dispersed on a first major surface of the nitrogen-doped graphene substrate,
wherein an atomic ratio of platinum and cobalt in the plurality of platinum-cobalt alloy nanoparticles is about 3:1.

26. The electrocatalyst of claim 25, wherein the weight of the plurality of platinum-cobalt alloy nanoparticles is about 30% of the total weight of the electrocatalyst.

27. The electrocatalyst of claim 25, wherein an average size of the platinum-cobalt alloy nanoparticles is about 2.2 nanometers to about 2.8 nanometers.

28. The electrocatalyst of claim 25, wherein a current density of the electrocatalyst measured at a potential of about 0.5 Volts (V) is about 1560 mA $cm^{-2}$.

29. The electrocatalyst of claim 25, wherein a power density of the electrocatalyst at a temperature of about 60° C. is about 805 mW $cm^{-2}$.

30. The electrocatalyst of claim 25, wherein the electrocatalyst is configured as an electrode of a proton exchange membrane fuel cell (PEMFC).

31. An electrocatalyst formed by providing a nitrogen-doped graphene substrate and dispersing a plurality of platinum-cobalt alloy nanoparticles on a first surface of the nitrogen-doped graphene substrate, wherein providing the nitrogen-doped graphene substrate comprises forming a polypyrrole layer on a first major surface of a graphene substrate and subsequently pyrolyzing the polypyrrole layer to form the nitrogen-doped graphene substrate.

32. The electrocatalyst of claim 31, wherein pyrolyzing the polypyrrole layer comprises heating the nitrogen-doped graphene substrate with the polypyrrole layer in presence of argon gas at a temperature of about 600° C. to about 800° C.

33. The electrocatalyst of claim 32, wherein the nitrogen-doped graphene substrate with the polypyrrole layer is heated for about 1 hour to about 2 hours.

34. The electrocatalyst of claim 31, wherein dispersing the plurality of platinum-cobalt alloy nanoparticles on the nitrogen-doped graphene substrate comprises dispersing the plurality of platinum-cobalt alloy nanoparticles by a microwave polyol reduction technique using ethylene glycol, chloroplatinic acid ($H_2PtCl_6$) and cobalt nitrate ($Co(NO_3)_2$).

35. The electrocatalyst of claim 34, wherein the plurality of platinum-cobalt alloy nanoparticles is dispersed on the nitrogen-doped graphene substrate within about 90 seconds.

\* \* \* \* \*

UNITED STATES PATENT AND TRADEMARK OFFICE
CERTIFICATE OF CORRECTION

PATENT NO. : 9,847,534 B2  
APPLICATION NO. : 14/397197  
DATED : December 19, 2017  
INVENTOR(S) : Sundara et al.

Page 1 of 1

It is certified that error appears in the above-identified patent and that said Letters Patent is hereby corrected as shown below:

In the Specification

In Column 7, Line 37, delete "413 and 418" and insert -- 416 and 418 --, therefor.

In Column 7, Line 55, delete "D-bend" and insert -- D-band --, therefor.

In Column 8, Line 1, delete "(G and D-bend)" and insert -- (G and D-band) --, therefor.

In Column 8, Line 16, delete "400 cV" and insert -- 400 eV --, therefor.

In Column 8, Line 18, delete "398.7 cV" and insert -- 398.7 eV --, therefor.

In Column 8, Line 32, delete "Further. FIG.9" and insert -- Further, FIG.9 --, therefor.

In Column 8, Line 38, delete "uniform costing" and insert -- uniform coating --, therefor.

In Column 10, Line 2, delete "about hours" and insert -- about 100 hours --, therefor.

Signed and Sealed this  
Tenth Day of April, 2018

Andrei Iancu  
*Director of the United States Patent and Trademark Office*